Nov. 7, 1939.   B. H. BROWALL   2,179,399

AUTOMATIC CONTROL MECHANISM FOR EMPTY AND LOAD BRAKES

Filed Nov. 30, 1937   3 Sheets—Sheet 1

Inventor:
B. H. Browall
By C. F. Wiedroth
Atty

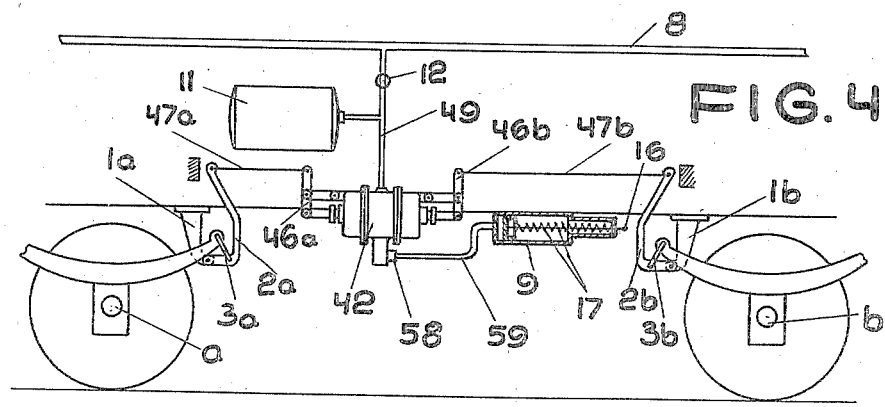
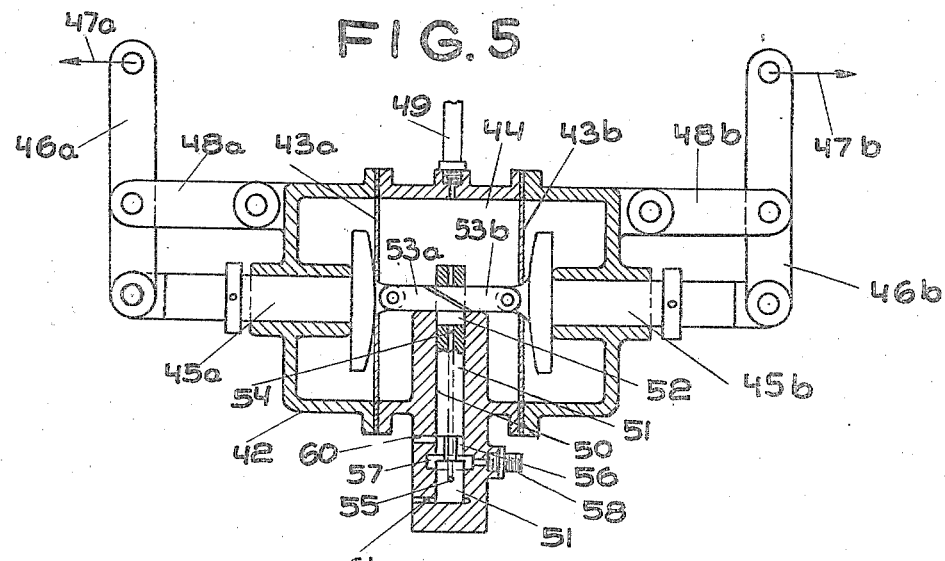
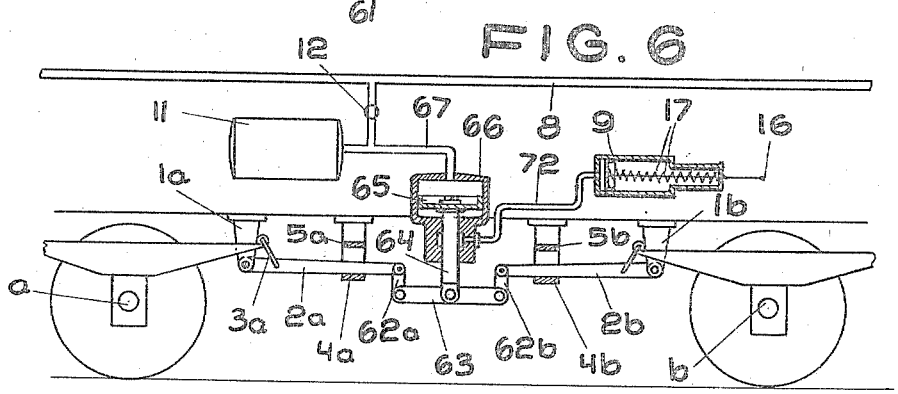

Patented Nov. 7, 1939

2,179,399

UNITED STATES PATENT OFFICE 2,179,399

AUTOMATIC CONTROL MECHANISM FOR EMPTY AND LOAD BRAKES

Bert Henry Browall, Malmo, Sweden, assignor to Svenska Aktiebolaget Bromsregulator, Malmo, Sweden, a corporation of Sweden Application November 30, 1937, Serial No. 177,334 In Germany December 3, 1936

7 Claims. (Cl. 188—195)

This invention relates to brake apparatus for vehicles, and more particularly to such brake apparatus in which the brakes are applied with greater force on loaded cars than on empty cars.

The principal object of the invention is to provide means automatically operative to condition the brake apparatus for empty car operation or for loaded car operation in accordance with variations in the weight of the load on the vehicle.

A further object of the invention is to provide automatic control means for empty and load brake equipments, operating in dependence not only of the weight but also of the distribution of weight of the load on the vehicle.

Another object of the invention is to provide an automatic control means for empty and load brake equipments and incorporating means for preventing the brake equipment being conditioned for loaded car operation as long as the amount of load carried at any end of the vehicle is below a predetermined value calculated to eliminate the risk of sliding the wheels at that end under full brake application.

Other objects of the invention and features of novelty, residing in advantageous forms, combinations and relations of parts, will be apparent from the following description taken in connection with the accompanying drawings, in which—

Fig. 4 is a diagrammatic side view, partly in section, of a third embodiment of the invention.

Fig. 5 is a section on a larger scale of a valve arrangement in the embodiment of Fig. 4.

Fig. 6 is a diagrammatic side view, partly in section, of a fourth embodiment of the invention.

Figure 1:
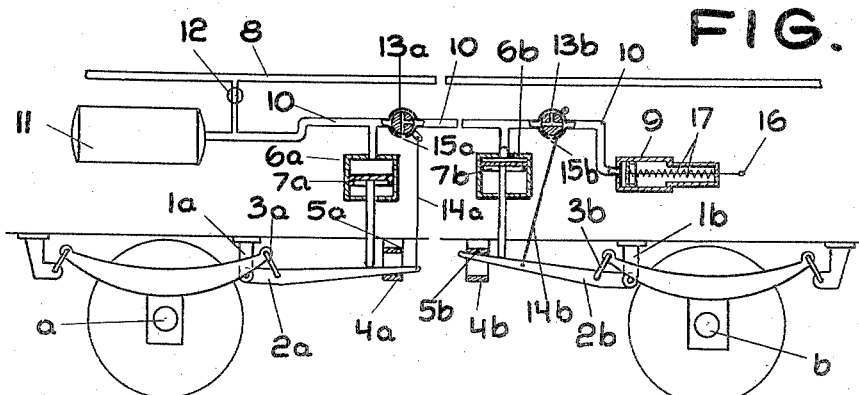
Fig. 1 is a diagrammatic side view, partly in section, of one embodiment of the invention.

Referring first to Fig. 1, there is mounted at each end of the car in a bracket $1a$ and $1b$, respectively, a lever $2a$ and $2b$, respectively, to which a spring suspension link $3a$ and $3b$, respectively, is pivotably connected. Each of these two levers is movable between two abutments $4a$ and $5a$, or $4b$ and $5b$, respectively. Each of the levers is acted upon through the spring suspension link by a force which is proportional to the load carried by the spring and tends to move the lever into, and maintain it in, engagement with the upper abutment $5a$ or $5b$, respectively. For each lever there is further provided a cylinder $6a$ or $6b$, respectively, in which a piston $7a$ or $7b$, respectively, is movable, which when the respective cylinder is put in operation tends to move the lever towards, and to hold it against, the lower abutment $4a$ or $4b$, respectively. The cylinders $6a$ and $6b$ are both connected to a conduit $10$ leading from a pressure fluid reservoir $11$ to a servomotor $9$. This pressure fluid reservoir $11$ is connected through a non-return valve $12$ to the main brake pipe $8$. Between the two cylinders $6a$ and $6b$ there is provided in the conduit $10$ a three-way valve $13a$ which is connected by means of a link rod $14a$ or the like with the lever $2a$ at one end of the car and is operated thereby. When this lever $2a$ engages the lower abutment $4a$ the three-way valve $13a$ closes the conduit $10$ between the cylinder $6a$ and the cylinder $6b$ and vents the cylinder $6b$ through a port $15a$ to the atmosphere. When the lever $2a$ engages the upper abutment $5a$ the three-way valve $13a$ closes the port $15a$ to the atmosphere and opens its inlet port or passage for pressure fluid to the cylinder $6b$ through the conduit $10$. Between the cylinder $6b$ and the servomotor $9$ there is connected in the conduit $10$ a further three-way valve $13b$ which is connected through a link rod $14b$ or the like with the lever $2b$ and is operated thereby. When this lever $2b$ engages the lower abutment $4b$ the three-way valve $13b$ closes the conduit $10$ between the cylinder $6b$ and the servomotor $9$ and vents the latter through a port $15b$ to the atmosphere. When the lever $2b$ engages the upper abutment $5b$ the three-way valve $13b$ closes the port $15b$ to the atmosphere and opens the conduit $10$ to the servomotor $9$. Pressure fluid from reservoir $11$ being now admitted to the servomotor, the latter by means of a shifting member (not shown) connected thereto at $16$ shifts the brake to the higher braking effort condition and holds the brake in this condition as long as the admission of pressure fluid is continued. When this supply of pressure fluid is discontinued and the servomotor is vented to the atmosphere, the servomotor piston returns to its starting position through the action of a spring $17$, the brake being thereby reset to the lower braking effort condition. As a matter of course, the return of the servomotor piston to the starting position corresponding to the lower braking effort condition may also take place through the action of fluid pressure, but the use of a return spring affords, from the point of view of safety, the advantage that the starting condition of the brake always will be that corresponding to the lower braking effort and that the return to this starting position will take place also when no fluid pressure is available. Besides, if the servomotor is to be operated by fluid pressure in both directions, a more complicated valve arrangement and a larger number of conduits and connections will be required, as is to be seen from the example diagrammatically shown in Fig. 8. When in the embodiment according to Fig. 1 the load carried by the wheel axle $a$ is insufficient to move the lever 2$a$ to the upper end position against the action of the fluid under pressure on the piston 7$a$ the admission of fluid under pressure to the cylinder 6$b$ and to the servomotor 9 is shut off, and the cylinder 6$b$ as well as the servomotor are vented to the atmosphere through the port 15$a$, the piston 7$b$ always allowing the lever 2$b$, as soon as the pressure in the cylinder 6$b$ is released, to take the upper end position in which the three-way valve 13$b$ establishes communication between the servomotor and the cylinder 6$b$. When, on the other hand, the load carried by the wheel axle $a$ is sufficient to move the lever 2$a$ to the upper end position, the three-way valve 13$a$ will be shifted so that fluid under pressure will have admission also to the cylinder 6$b$. If now, however, the load carried by the wheel axle $b$ is not sufficient to hold the lever 2$b$ in the upper end position against the action of the fluid pressure on the piston 7$b$, the lever 2$b$ will at once be moved into the lower end position, the three-way valve 13$b$ being thereby shifted so that the admission of pressure fluid to the servomotor 9 is shut off and the latter is instead vented to the atmosphere through the port 15$b$. Thus, also in this case the servomotor will not be actuated so that a shifting of the brake to the higher braking effort condition does not take place. If, on the other hand, the load on the wheel axle $b$ would be sufficient to hold the lever 2$b$ in the upper end position against the action of the fluid pressure on the piston 7$b$, the pressure fluid will have free admission to the servomotor and this performs the shifting of the brake to the higher braking effort condition. Thus, shifting of the brake to the higher braking effort condition will take place only in case both the load carried by the wheel axle $a$ and the load carried by the wheel axle $b$ exceed the predetermined limit above which the risk of causing the wheels to slide if braked with the brake in the higher braking effort condition is eliminated to a satisfactory degree.

Figure 2:
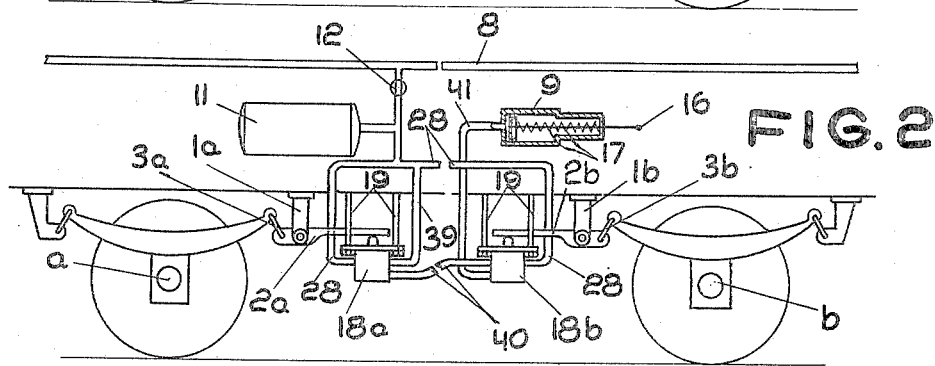
Fig. 2 is a similar view of a second embodiment of the invention.
Figure 3:
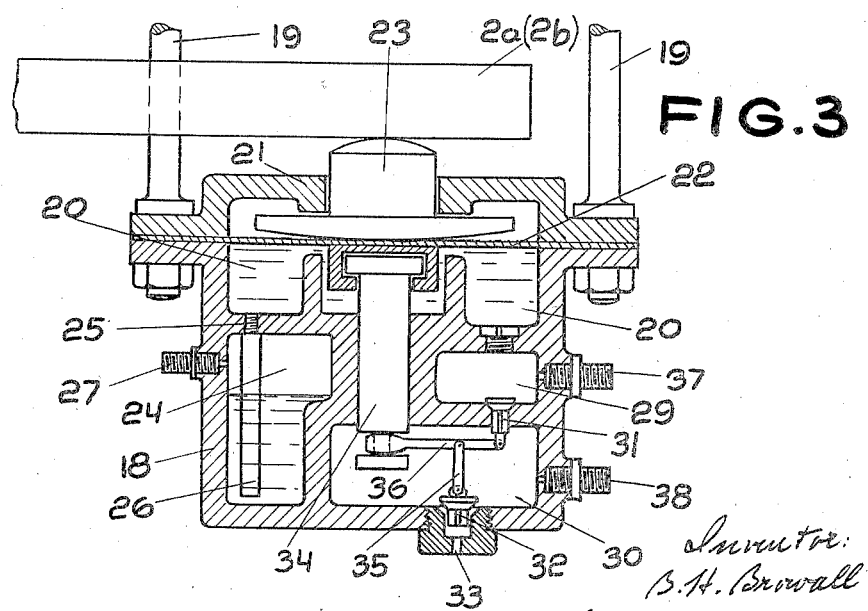
Fig. 3 is a section on a larger scale of a valve arrangement in the embodiment of Fig. 2.

In the embodiment shown in Fig. 2 each lever 2$a$ and 2$b$ is associated with a valve housing 18$a$ and 18$b$, respectively. This housing is identical for both levers and is shown separately in Fig. 3 where it is generally designated by 18. This valve housing is secured to the car frame by means of bolts 19. It contains an upper chamber 20 which is tightly sealed at the top by a diaphragm 22 fixed between the housing and a cover 21 mounted thereon, the diaphragm carrying a pin 23 projecting through a central opening in the cover 21 against which pin the lever 2$a$ or 2$b$, respectively, is resting. The lever 2$a$ or 2$b$, respectively, tends through the action of the load carried by the corresponding wheel axle to hold the diaphragm 22 and the pin 23 pressed down in the lower position. The chamber is preferably filled with a damping fluid and communicates with a chamber 24 located under the same in the housing 18 preferably through a restricted port 25 and a tube 26 projecting downwards from said port into the chamber 24 near to the bottom thereof. The chamber 24 which preferably is partly filled with damping fluid is connected through a connection member 27 to a conduit 28 leading to the pressure fluid reservoir 11 connected to the brake pipe 8 through the non-return valve 12. Between two further chambers 29 and 30 in the housing 18 there is provided a valve 31, this valve 31 and a valve 32 which controls a port between the chamber 30 and the atmosphere being controlled by the diaphragm 22 by means of a spindle 34 connected with the latter in such a manner that the valve 31 is closed, the valve 32 on the other hand being open, when the diaphragm 22 is held in its upper end position, whereas the valve 32 is closed, and the valve 31 open, when the diaphragm is pressed into its lower end position. The spindle 34 is tightly but slidably mounted in a bore in the wall between the chambers 20 and 30 in the housing 18, and the valve 32 is, for example by means of a link 35, connected with a lever 36 pivotally mounted on the valve 31 and engaging in a recess at the lower end of the spindle 34. The chamber 29 is provided with a connection member 37 and the chamber 30 with a connection member 38. The connection member 37 of the valve housing 18$a$ is connected by conduit 39 with the conduit 28, as shown in Fig. 2. The connection member 38 of the valve housing 18$a$ is connected through a conduit 40 with the connection member 37 of the valve housing 18$b$, and the connection member 38 of the valve housing 18$b$ communicates through a conduit 41 with the servomotor 9.

The diaphragm 22 with the pin 23 is pressed downwards against the pressure exerted by the corresponding lever 2$a$ or 2$b$, respectively on the under side of the diaphragm, only in case the load carried by the corresponding axle exceeds the limit above which the risk of causing the wheels on said axle to slide if braked with the brake in the higher braking effort condition is practically eliminated. If the diaphragm 22 is pressed down only in the housing 18$a$ but not in the housing 18$b$ fluid under pressure is carried through the chambers 29 and 30 of the housing 18$a$ to the chamber 29 of the housing 18$b$ but in the latter the valve 31 is closed and the valve 32 open, so that the pressure fluid is not allowed to reach the servomotor 9 and the fluid therein is vented to the atmosphere through the open valve 32 in the housing 18$b$. When the diaphragm 22 of the housing 18$b$ but not that of the housing 18$a$ is pressed down in its lower position, the admission of pressure fluid to the servomotor is blocked by the closed valve 31 of the housing 18$a$, and the servomotor is vented to the atmosphere through the chambers 30 and 29 of the housing 18$b$ and through the open valve 32 of the housing 18$a$. Only when the diaphragm 22 is pressed down at the same time in both housings 18$a$ and 18$b$ will pressure fluid be supplied to the servomotor 9, so that the brake is shifted to, and maintained in, the higher braking effort condition.

In the embodiment shown in Fig. 4 the two levers 2$a$ and 2$b$ both together serve to operate a valve common to both of them in such a manner that said valve will allow admission of pressure fluid from the brake pipe 8, or the pressure fluid reservoir 11, to the servomotor 9 only when the load at both wheel axles exceeds the limit above which the risk of the wheels being slid if braked with the brake in the higher braking effort condition is practically eliminated, but under all other conditions will shut off the supply of pressure fluid to the servomotor and vent the latter to the atmosphere. The housing of this valve which is shown in detail in Fig. 5 is designated by 42. It encloses a chamber 44 confined on both sides by diaphragms 43a and 43b. In engagement with the diaphragms there are provided two stems 45a and 45b which are slidable within predetermined limits in the end of the housing and which are connected through levers 46a and 46b as well as through connecting rods 47a and 47b with the levers 2a and 2b. The levers 46a and 46b are pivoted to link members 48a and 48b which are pivotably mounted on ears provided on the housing 42. The chamber 44 is connected through a conduit 49 with the reservoir 11 connected by the non-return valve 12 to the brake pipe 8. In a bore 50 a valve slide 51 is tightly but slidably mounted which in its upper portion is provided with a slot 52 in which two coacting wedges 53a and 53b connected each with one of the diaphragms 43a and 43b are located. From the chamber 44 a channel 54 leads through the slide 51 and opens in its peripheral surface as shown at 55 in Fig. 5, and more particularly below a circumferential groove 56 provided in the slide. Within the bore 50 a circumferential groove 57 is provided which is connected by means of a connecting member 58 with a conduit 59 leading to the servo-motor. If the slide 51 takes the position shown in Fig. 5 the circumferential groove 56 communicates with the circumferential groove 57 and a port 60 opening in the boring and leading to the atmosphere. From the bottom end of the boring 50 a port 61 leads to the atmosphere.

If the loads carried by the wheel axles a and b simultaneously at both axles exceed the predetermined limit so that the two stems 45a and 45b are simultaneously moved to their inner end positions against the substantially constant pressure in the chamber 44 acting on the diaphragm, the wedges 53a and 53b will be moved towards each other so as to lift the slide 51, whereby the connection between the circumferential grooves 56 and 57 is broken off and the opening 55 of the channel 54 brought to communicate with the groove 57 and the conduit 59 to the servo motor, so that the brake is shifted to the higher braking effort condition. If, on the other hand, the predetermined load limit is not reached at one of the wheel axles a or b, so that one of the stems 45a and 45b under the action of the pressure in the chamber 44 is in the outer end position, the slide will not, whatever the position occupied by the stem, be lifted in the manner described above, so that no pressure fluid is supplied to the servomotor and the latter remains vented to the atmosphere through the conduit 59, the grooves 57 and 56 and the port 60.

Figure 7:
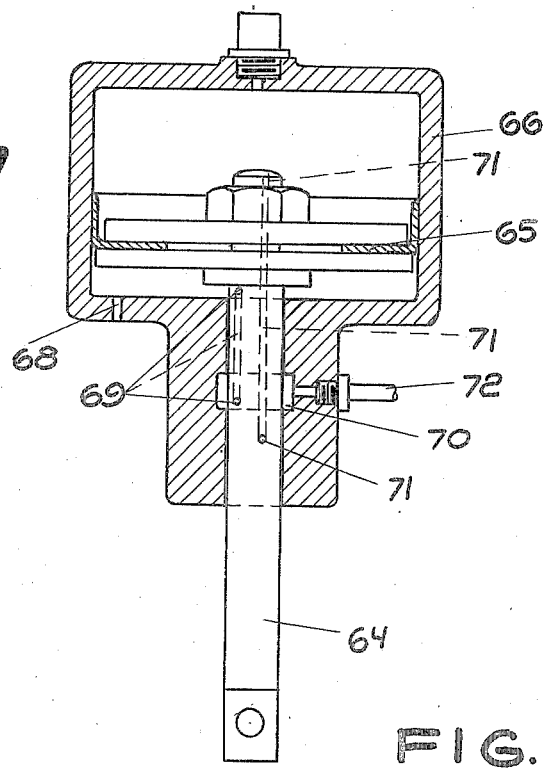
Fig. 7 is a section on a larger scale of a valve arrangement in the embodiment of Fig. 6.

In the embodiment according to Fig. 6 the levers 2a and 2b are each by means of links 62a and 62b connected with one end of a floating lever 63 which is journaled at the centre in the piston rod 64 of a piston 65 which is movable in a cylinder 66. The cylinder chamber above the piston communicates through a conduit 67 with the pressure fluid reservoir 11 connected through the non-return valve 12 to the brake pipe 8, while the cylinder chamber below the piston 65 is vented to the atmosphere through a port 68. As is best shown in Fig. 7 which illustrates the cylinder 66, the piston 65 and the piston rod 64 in detail, the piston rod 64 is formed as a slide valve and for this purpose provided with a channel 69 which in the lower end position of the piston connects a circumferential groove 70 located within the piston rod guide with the cylinder chamber located below the piston 65, and further with a channel 71 which in the upper end position connects the circumferential groove 70 with the cylinder chamber located above the piston 65. The servomotor 9 is connected by means of a conduit 72 to the groove 70.

Each lever 2a and 2b, independently of its position, is loaded by half the force of the piston 65. If one of the levers 2a, 2b against the action of the force exerted thereon by the piston 65 through the floating lever 63 is transferred into its upper end position, i. e., into engagement with the upper abutment 5a or 5b, respectively, the piston will be displaced only half-way towards the upper end position, and the arrangement is chosen so that the servomotor in this case remains vented to the atmosphere through the conduit 72, the groove 70, the channel 69, the cylinder chamber below the piston 65 and the port 68. Only when the two levers 2a and 2b at the same time are in their upper end positions the piston 65 will occupy its upper end position in which the circumferential groove 70 and thereby also the servomotor 9 are shut off from the atmosphere and are supplied with pressure fluid through the channel 71 from the cylinder chamber above the piston 65, so that the brake will be shifted to, and held in, the higher braking effort condition.

Figure 8:
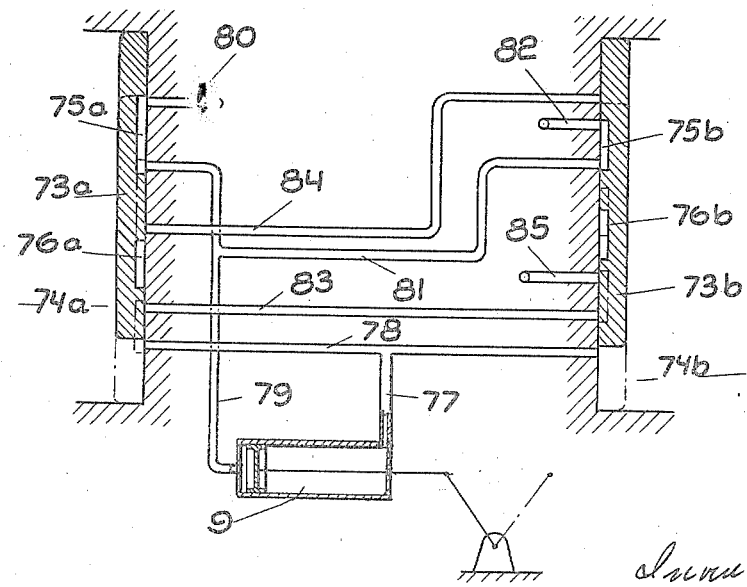
Fig. 8 is a diagrammatic view, partly in section, of a fifth embodiment of the invention.

In the embodiment shown in Fig. 8, where the return of the servomotor piston to the end position corresponding to the lower braking effort condition is to be effected not by means of a spring but by means of pressure fluid, the valves which control the admission of pressure fluid to the servomotor and the venting of the latter to the atmosphere, instead of three-way valves consist of slide valves 73a and 73b connected with the levers 2a and 2b, respectively, at the opposite ends of the car and adapted to cover ports opening into pressure fluid chambers 74a and 74b, respectively, connected to the pressure fluid conduit 10 and the pressure fluid reservoir 11 (Fig. 1), or to interconnect and to vent said ports to the atmosphere through the recesses 75a, 76a and 75b, 76b, respectively. The slide valves 73a, 73b are connected with the levers 2a and 2b, respectively, in such a manner that they, when the load on the respective wheel axles a and b is small and the levers 2a and 2b accordingly remain in the end position corresponding to the lower braking effort condition, always are in the upper position as shown in Fig. 8, whereas they, as soon as the load on the wheel axles exceeds the predetermined limit, are moved by the respective levers 2a and 2b to the lower end postion corresponding to the higher braking effort condition indicated by dash and dot lines. In the lower braking effort condition the piston of the servomotor is in the left hand end of the servomotor cylinder 9 as shown in Fig. 8, while in the higher braking effort condition it is in the right hand end of the cylinder. When both slide valves 73a and 73b, due to the load on the two wheel axles a and b being below the predetermined limit, are in the upper end position, as shown in Fig. 8, the right hand end of the servomotor cylinder 9 is connected by the conduits 77 and 78 with the pressure fluid chambers 74a and 74b, while the left hand end of the servomotor cylinder is vented, on the one hand, through the conduit 79, the recess 75a in the slide 73a and the conduit 80 and, on the other hand, through the conduit 81, the recess 75b in the slide 73b and the conduit 82 to the atmosphere. Thus, when both slide valves occupy the upper end position the servomotor piston will be held by fluid pressure in the left hand position corresponding to the lower braking effort condition. If now the load on the wheel axle $a$ exceeds the predetermined limit, and the slide valve 73a is thereby moved into its lower end position, whereas the slide valve 73b, due to insufficient load on the wheel axle $b$, remains in the upper end position, the right hand end of the servomotor 9 communicates through the conduit 77 and the right hand portion of the conduit 78 with the pressure fluid chamber 74b, while the left hand branch of the conduit 78 is connected through the recess 76a in the slide valve 73a with the conduit 83 which, however, is shut off by the slide valve 73b. The right hand end of the servomotor is thus subjected to fluid pressure. The left hand end of the servomotor is thereby vented through the conduits 79 and 81, the recess 75b in the slide valve 73b and the conduit 82, while the portion of the conduit 79 opening towards the chamber 74a is connected through the recess 75a in the slide 73a with the conduit 84 which, however, is shut off from the chamber 74b by the slide valve 73b. The left hand end of the servomotor is thus vented to the atmosphere, and the servomotor piston is still held in the left hand end position corresponding to the lower braking effort condition. If now the force acting on the wheel axle $a$ comes short of the predetermined load limit and the slide valve 73a accordingly takes the upper end position, whereas the slide valve 73b takes the lower end position due to the higher load on the wheel axle $b$, the pressure conditions of the servomotor remain unchanged, the right hand end of the servomotor being connected through the conduit 77 and the left hand branch of the conduit 78 with the pressure fluid chamber 74a, while the right hand branch of the conduit 78 is shut off by the slide valve 73b. The left hand end of the servomotor is vented through 79, 75a and 80, while the conduit 81 is shut off from the chamber 74b by the slide valve 73b. In this position the servomotor will also occupy the position corresponding to the lower braking effort condition. If both slide valves 73a and 73b, due to the loads on both the wheel axles $a$ and $b$ exceeding the predetermined load limit, are in their lower end positions, the right hand end of the servomotor 9 will be vented through the conduits 77 and 78, the recess 76a in the slide 73a, the conduit 83, the recess 76b and the conduit 85, while the left hand end of the servomotor 9 communicates with the pressure fluid chamber 74b through the conduit 79, the recess 75a in the slide valve 73a and the conduit 84 which is left open to the chamber 74b, the slide 73b being in its lower end position. Thus, only in this case when both slide valves 73a and 73b are in their lower end positions due to the load on both the wheel axles $a$ and $b$ exceeding the predetermined limit, will the left hand side of the servomotor piston be supplied with pressure fluid and the brake shifted to the higher braking effort condition.

The invention is not confined to the embodiments described above and shown in the drawings for the purpose of illustrating the invention only. For example, it is preferable but not always necessary to use a servomotor, the shifting of the brake being if desired performed directly for example by means of the slide 51 or the piston 64 in the embodiments shown in Figures 4 to 5 and 6 to 7, respectively. To derive the forces proportional to the fractions of the car load carried by the respective wheel axles it is possible to use other means instead of the levers 2a and 2b as shown, for example oil pressure pots operated by the car spring reaction and pistons, diaphragms or the like acted upon by oil pressure in said pots. Also in other respects the constructional features of the apparatus may be varied within wide limits without departing from the mode of operation which is common to all of the forms of invention illustrated.

What I claim and desire to secure by Letters Patent is:

1. In combination with an empty and load brake equipment for a vehicle, an automatic mechanism for controlling the conditioning of the brake for empty or load operation, comprising members movable between two opposite positions, such members being disposed at both ends of the vehicle and each arranged to be actuated by the load resting on the corresponding end of the vehicle so as to take one of its positions when the vehicle is empty and the opposite position when said vehicle end is loaded, servomotor means for executing the shifting of the brake into empty or load operating condition respectively, and means interconnecting the movable members and the servomotor means, said interconnecting means being so arranged as to cause the servomotor means to keep the brake conditioned for empty car operation as long as any of the movable members takes its position corresponding to empty car, and to condition the brake for loaded car operation only when all of the movable members take the position corresponding to loaded car.

2. In combination with an empty and load brake equipment for a vehicle, an automatic control mechanism for the conditioning of the brake for empty or load operation, comprising load influenced controlling members at both ends of the vehicle, said controlling members being arranged in series so that load operation of the brake can take place only when all of the controlling members are in load position.

3. In combination with a vehicle brake of the type which is adapted to be set either in a lower or in a higher braking effort condition by a member shiftable from one to the other of two positions corresponding to the lower and the higher braking effort condition of the brake respectively, an arrangement for controlling said shiftable member automatically according to the load of the vehicle carried on supporting springs at both ends thereof, comprising movable members disposed at both ends of the vehicle and arranged to take different positions independently of each other according to the load values transmitted through the supporting springs of the vehicle at the respective ends thereof but independently of the vehicle supporting spring deflection caused by said load, and means connecting said shiftable member to said movable members so that each of said movable members is capable not only of preventing the shiftable member from being shifted from the lower to the higher braking effort position until the value of the load transmitted through the supporting springs of the vehicle at the respective end thereof exceeds a predetermined limit, but also of causing the said shiftable member to be shifted back to the lower braking effort condition as soon as the value of the load transmitted through the supporting springs of the vehicle at the respective end thereof is again reduced below said limit.

4. An arrangement as claimed in claim 3, in which the shiftable member is arranged to be actuated by a pressure fluid operated servomotor controlled by valves each of which is operatively connected to one of the movable members and controls an inlet port and an outlet port in a pressure fluid supply conduit to the servomotor, and in which said valves are arranged in series in said conduit so that the pressure fluid for admission to the servomotor for causing it to shift the brake from the lower to the higher braking effort condition must pass through the inlet ports of all the valves in succession, the inlet and outlet ports of each valve being so arranged that when the inlet port is closed the outlet port is opened and allows escape of pressure fluid from the conduit extending from the valve towards the servomotor.

5. An arrangement as claimed in claim 3, in which the movements of the movable members are summed up on a common control member for the shiftable member, and in which said control member is so arranged and related to the said shiftable member that the latter is set in the higher braking effort position only when said control member is in an end position which it takes only when all the movable members are in the position into which each of them is moved independently of the other when the load at the respective end of the vehicle exceeds the predetermined limit, the shiftable member being set in the lower braking effort condition in all other positions of the said control member.

6. In combination with an empty and load brake equipment for a vehicle, an automatic control mechanism for conditioning the brake for empty or load operation, comprising load influenced controlling members at both ends of the vehicle, each of said controlling members being movable, independently of the other, into either of an empty position and a load position, and each capable, likewise independently of the other, of setting the brake into the empty operating condition, namely when moved from the load position to the empty position, so that the brake will be in the load operating condition only when both the controlling members are in the load position.

7. In combination with an empty and load brake equipment for a vehicle, an automatic control mechanism for conditioning the brake for empty and load operation, comprising a pressure fluid operated servomotor for shifting the brake from the condition for empty operation to the condition for load operation and vice versa, a pressure fluid supply conduit for said servomotor, and load influenced members at both ends of the vehicle for controlling the operation of said servomotor, said controlling members being movable, independently of each other, into either of an empty and a load position, and arranged in series in said pressure fluid supply conduit so as to render said servomotor operative for shifting the brake to, and maintaining it in, the condition for load operation only when, and as long as, the controlling members at both ends of the vehicle take the load position.

BERT HENRY BROWALL.